No. 832,159. PATENTED OCT. 2, 1906.
A. A. PRATT.
REGULATOR FOR GAS BURNERS.
APPLICATION FILED NOV. 7, 1905.
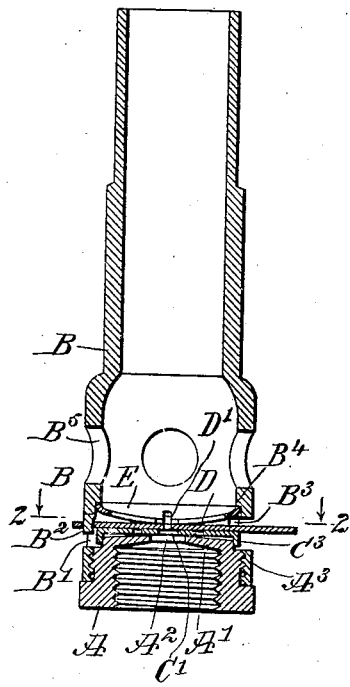
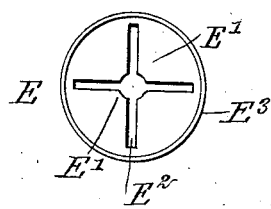
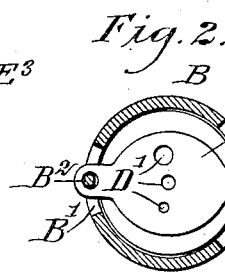
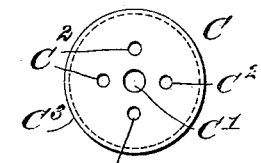
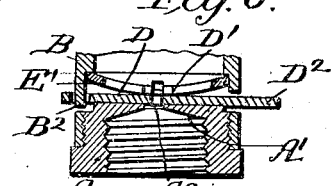
WITNESSES:
Edward Thorpe.
INVENTOR
Allison A. Pratt
BY
ATTORNEYS

UNITED STATES PATENT OFFICE.

ALLISON A. PRATT, OF NEW YORK, N. Y., ASSIGNOR OF ONE-HALF TO EDWIN J. SELLEY, OF NEW YORK, N. Y.

REGULATOR FOR GAS-BURNERS.

No. 832,159.  Specification of Letters Patent.  Patented Oct. 2, 1906.

Application filed November 7, 1905. Serial No. 286,220.

*To all whom it may concern:*

Be it known that I, ALLISON A. PRATT, a citizen of the United States, and a resident of the city of New York, borough of Manhattan, in the county and State of New York, have invented a new and Improved Regulator for Burners, of which the following is a full, clear, and exact description.

The invention relates to incandescent and other gas burners; and its object is to provide a new and improved regulator arranged for controlling the amount of gas passing from a source of gas-supply into the mixing-chamber of the burner to permit an inflammable mixture of the proper proportions of gas and air, according to the quality and pressure of the gas-supply.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is a sectional plan view of the same on the line 2 2 of Fig. 1. Fig. 3 is a plan view of the disk spring. Fig. 4 is a plan view of the valve-seat, and Fig. 5 is a side elevation of the nipple. Fig. 6 is a vertical section of a modification, the rocking valve-seat being dispensed with.

The nipple $a$ is adapted to be screwed or otherwise secured to a gas-pipe connected with a suitable source of gas-supply, and on the said nipple screws a mixing-chamber B, in which the gas and air are united and mixed to form a combustible or inflammable mixture of gas and air. The top A' of the nipple A is provided with a central aperture $A^2$, registering with a central aperture C', formed in a valve-seat C, mounted on the outer rounded-off surface of the top A' of the nipple A, so that the valve-seat C is free to rock on the top A' of the nipple A. The central aperture C' of the valve-seat C is adapted to register with any one of a series of openings D', formed in a lever-valve D, resting on top of the valve-seat C and pressed on at its upper surface by a disk spring E, held within the mixing-chamber B. The wall of the mixing-chamber B is formed with an opening B', arranged to leave a depending pivot-pin $B^2$, forming the fulcrum for the lever-valve D to swing on, the latter being provided at its free end with a suitable handle $D^2$, projecting through an opening $B^3$, likewise formed in the wall of the mixing-chamber B, directly opposite the opening B', as plainly illustrated in Figs. 1 and 2.

The series of openings D' are arranged on the arc of a circle the center of which coincides with that of the pivot-pin $B^2$, and when the lever-valve D is swung laterally by the operator having hold of the handle $D^2$ then either of the openings in the said series of openings D' can be moved in register with the central aperture C' on the valve-seat C.

By having the valve-seat C mounted to rock on the upper end A' of the nipple A it is evident that a very snug fit is had between the lever-valve D and the said valve-seat C to prevent leakage of gas, it being understood that the lever-valve D is pressed on near its middle by the spring-tongues E' of the disk spring E, made in dish shape and having the said spring-tongues formed by slots $E^2$, as plainly indicated in Fig. 3. The upturned edge $E^3$ of the disk spring E abuts against an annular shoulder $B^4$, formed in the mixing-chamber B, to allow the tongues E' to rest on top of the lever-valve D, with a view to hold the same in firm contact with the rocking valve-seat C. The rocking valve-seat C, as shown in Fig. 4, is provided with a plurality of leak-apertures $C^2$, arranged around the central aperture C', so that in case any gas leaks between the rounded-off outer surface of the top A' and the under side of the valve-seat C then such gas can escape by way of the apertures $C^2$ and mingle in with other gas and air and be burned in the burner and not escape into the room.

Lateral movement of the valve-seat C is prevented by an annular flange $C^3$, depending integrally from the outer edge of the seat and fitting loosely against an annular shoulder $A^3$, formed on the nipple A. It is understood that when the several parts are assembled and the mixing-chamber B is screwed down on the nipple A then the disk spring E exerts the desired pressure on the top of the lever-valve D to hold the same in proper contact with the valve-seat C and to hold the latter in proper position on the nipple A.

It is understood that the mixing-chamber

B is provided with the usual air-inlet openings B⁵ for the admission of air to be mixed with the gas passing through the registering apertures A², C', and D' into the mixing-chamber B.

The device is very simple and durable in construction, can be cheaply manufactured, and is not liable to get easily out of order. It will also be seen that by the operator manipulating the handle D² any one of the graduated openings D' can be moved in register with the apertures C' to admit more or less gas to the mixing-chamber B according to the quality and pressure of the gas.

Thus from the foregoing it will be seen that the amount of gas passing from a source of gas-supply into the mixing-chamber can be readily controlled by the operator to form an inflammable mixture of the proper proportions of gas and air according to the quality and pressure of the gas-supply.

It is understood that the rocking valve-seat C may be dispensed with and the lever-valve D used directly in contact with the nipple-top and its aperture A² to insure a regulation of the flow of gas according to whichever opening D' is in register with the aperture A², the nipple-top A' then forming the valve-seat for the lever-valve D.

By having the pivot-pin B² depending, as shown, the lever-valve D is held against leaving the said pivot-pin on screwing the nipple A upon the mixing-chamber B.

Having thus described my invention, I claim as new and desire to secure by Letters Patent—

1. A regulator for gas-burners, comprising a valve-seat with a central aperture, a lever-valve having a series of graduated openings adapted to register with the valve-seat aperture, and a disk spring above said valve, said disk being perforated centrally and dished downwardly whereby to engage the valve around the openings therein, when said openings are in register with the aperture of the valve-seat.

2. A regulator for gas-burners, comprising a valve-seat with a central aperture, a lever-valve having a series of graduated openings adapted to register with the valve-seat aperture, a disk spring above said valve, said disk being perforated centrally and dished downwardly whereby to engage the valve around the openings therein when said openings are in register with the opening of the valve-seat, and a nipple connected with a gas-supply and on which the valve-seat is removably mounted.

3. A regulator for gas-burners, comprising a valve-seat with a central aperture, a lever-valve having a series of graduated openings adapted to register with the valve-seat aperture, a disk spring above said valve, said disk being perforated centrally and dished downwardly, whereby to engage the valve around the openings therein when said openings are in register with the aperture of the valve-seat, and a nipple connected with a gas-supply and having a rounded-off surface forming a bearing for the said valve-seat to rock on.

4. A regulator for gas-burners, comprising a valve-seat having a central aperture, a lever-valve having a series of graduated openings and adapted to register with the valve-seat aperture, a disk spring above said valve, said disk being perforated centrally and dished downwardly, whereby to engage the valve around the openings therein when said openings are in register with the aperture of the valve-seat, and a nipple connected with the gas-supply and having a rounded-off surface forming a bearing for the said valve-seat to rock on, the latter having leak-openings to allow gas passing between the opposite face of the valve-seat and the said rounded-off surface to escape.

5. A regulator for gas-burners, comprising a nipple for connection with a gas-supply and having an apertured bearing-surface, a disk-valve seat on the said bearing-surface and having an aperture registering with the aperture in the said bearing-surface, a lever-valve in contact with the said valve-seat and having a series of graduated openings adapted to register with the said valve-seat aperture, a mixing-chamber held on the said nipple and provided with an air-inlet, the said mixing-chamber having a pivot-pin projecting downward for the said lever-pin to swing on, said lever-valve being held on said pin by the screwing down of the mixing-chamber B, and a disk spring held in the said mixing-chamber and bearing on the said lever-valve.

6. A regulator for gas-burners, comprising a nipple for connection with a gas-supply and having an apertured bearing-surface, a disk-valve seat on the said bearing-surface and having an aperture registering with the aperture in the said bearing-surface, a lever-valve in contact with the said valve-seat and having a series of graduated openings adapted to register with the said valve-seat aperture, a mixing-chamber held on the said nipple and provided with an air-inlet, the wall of the said mixing-chamber being cut out to form an integral pivot-pin for one end of the said lever-valve to swing on, the free end of the latter extending to the outside of the mixing-chamber, and a disk spring held in the said mixing-chamber and bearing on the said lever-valve.

7. A regulator for gas-burners, comprising a nipple for connection with a gas-supply and having an apertured bearing-surface, a disk-valve seat on the said bearing-surface and having an aperture registering with the aperture in the said bearing-surface, a lever-valve in contact with the said valve-seat and having a series of graduated openings adapted to register with the said valve-seat aperture, a mixing-chamber held on the said nipple and provided with an air-inlet, and a disk spring held in the said mixing-chamber and bearing on the said lever-valve, the said disk spring having its upturned edge seated on a shoulder on the mixing-chamber.

8. A regulator for gas-burners, comprising a nipple for connection with a gas-supply and having an apertured bearing-surface, a disk-valve seat on the said bearing-surface and having an aperture registering with the aperture in the said bearing-surface, a lever-valve in contact with the said valve-seat and having a series of graduated openings adapted to register with the said valve-seat aperture, a mixing-chamber held on the said nipple and provided with an air-inlet, and a disk spring held in the said mixing-chamber and bearing on the said lever-valve, the said disk spring being dished and slotted to form spring-tongues, the edge of the disk spring being seated on an annular shoulder formed interiorly in the mixing-chamber.

In testimony whereof I have signed my name to this specification in the presence of two subscribing witnesses.

ALLISON A. PRATT.

Witnesses:
   THEO. G. HOSTER,
   EVERARD B. MARSHALL.